U S009747356B2

(12) United States Patent
Lu et al.

(10) Patent No.: US 9,747,356 B2
(45) Date of Patent: Aug. 29, 2017

(54) EAGER REPLICATION OF UNCOMMITTED TRANSACTIONS

(71) Applicant: Oracle International Corporation, Redwood Shores, CA (US)

(72) Inventors: Edwina Ming-Yue Lu, Palo Alto, CA (US); Nimar Singh Arora, Union City, CA (US); Lik Wong, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 125 days.

(21) Appl. No.: 14/162,053

(22) Filed: Jan. 23, 2014

(65) Prior Publication Data

US 2015/0205850 A1    Jul. 23, 2015

(51) Int. Cl.
*G06F 17/30* (2006.01)

(52) U.S. Cl.
CPC .. *G06F 17/30575* (2013.01); *G06F 17/30368* (2013.01); *G06F 17/30377* (2013.01)

(58) Field of Classification Search
CPC ........... G06F 17/30575; G06F 11/1446; G06F 17/30368; G06F 17/30377; G06F 17/3038
USPC ........................................ 707/610, 613, 615
See application file for complete search history.

(56) References Cited

U.S. PATENT DOCUMENTS

| 5,170,480 | A | 12/1992 | Mohan et al. |
| 5,530,855 | A | 6/1996 | Satoh et al. |
| 5,613,106 | A * | 3/1997 | Thurman ................ G06F 9/466 707/648 |
| 6,205,449 | B1 | 3/2001 | Rastogi et al. |
| 6,289,357 | B1 | 9/2001 | Parker |
| 6,553,392 | B1 * | 4/2003 | Mosher, Jr. ......... G06F 11/2069 714/15 |
| 6,980,988 | B1 | 12/2005 | Demers et al. |
| 2002/0103816 | A1 | 8/2002 | Ganesh et al. |
| 2004/0133591 | A1 * | 7/2004 | Holenstein .......... G06F 11/2064 707/999.102 |
| 2011/0161288 | A1 * | 6/2011 | Morimoto ........... G06F 11/1474 707/611 |
| 2012/0278282 | A1 * | 11/2012 | Lu ..................... G06F 17/30575 707/634 |

(Continued)

OTHER PUBLICATIONS

US Appl. No. 09/748,408, filed Dec. 22, 2000.

(Continued)

*Primary Examiner* — Vincent F Boccio
(74) *Attorney, Agent, or Firm* — Hickman Palermo Becker Bingham LLP

(57) ABSTRACT

Techniques are provided for eager replication of uncommitted transactions. A first plurality of change records is received, corresponding to database changes applied to a source database in a first transaction. First transaction dependency data is computed based on the first transaction. At least a portion of the first plurality of change records is applied to the target database before processing a commit record indicating that has been committed on the source database. Target dependency data is updated after processing the first commit record to reflect completion of the first transaction, the target dependency data including dependency data for a plurality of transactions applied or scheduled to be applied on a target database.

20 Claims, 9 Drawing Sheets

(56) References Cited

U.S. PATENT DOCUMENTS

2014/0095813 A1* 4/2014 Shukla ................ G06F 3/0611
　　　　　　　　　　　　　　　　　　　　711/154

OTHER PUBLICATIONS

US Appl. No. 09/156,557, filed Sep. 17, 1998.
US Appl. No. 09/156,548, filed Sep. 17, 1998.
Oracle Database, Xstream Guide, 11g Release 2 (11.2) dated Jul. 2013, 302 pages.

* cited by examiner

EAGER REPLICATION OF UNCOMMITTED TRANSACTIONS

TECHNICAL FIELD

The present disclosure generally relates to data management, and, more specifically, to data replication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers systems may be configured to store and retrieve large amounts of data. Typically, computer systems rely on database systems to perform this function. Replication is the process of duplicating data from a source database onto another database system, herein referred to as a target database.

One approach to replication is the physical replication approach. Under the physical replication approach, the changes made to data blocks on the source database are made to replicas of those data blocks on a target database. Because the source database is replicated at the lowest atomic level of storage space on the target database, the target database is a physical replica of the source database. Another approach to replicating data is the logical replication approach. Under the logical replication approach, database commands that modify data on the source database are re-executed on the target database. While executing the same database commands guarantees that changes are replicated at the record level, the changes are not replicated at the data block level.

A transaction is a set of operations that change data. In database systems, the operations are specified by one or more database commands. Committing a transaction refers to making the changes for a transaction permanent. Under transaction processing, all the changes for a transaction are made atomically. For each transaction, either all changes are committed, or the transaction is rolled back.

After a transaction is committed on a source database, the transaction may be applied on the target database. As result, there is latency between when a transaction is committed on the source database and when it is applied and committed at the target database. For large transactions, this latency can be very significant. It is desirable to develop an approach that eliminates such latency.

SUMMARY OF THE INVENTION

Techniques are provided for client and server integration for eager application of uncommitted transactions. The claims are hereby incorporated into this summary.

DESCRIPTION OF EXAMPLE EMBODIMENTS

Figure 1:
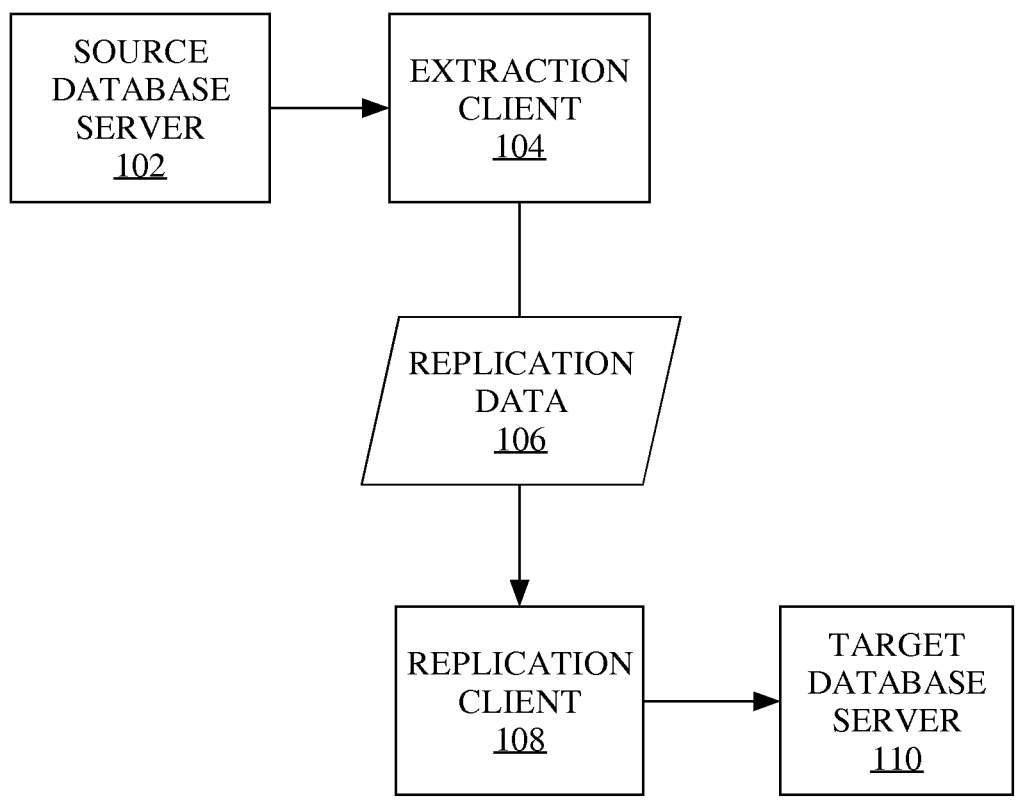
FIG. 1 is a block diagram depicting an embodiment of a system for replicating data between a source database and a target database.

Eager application of uncommitted transactions is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

Techniques are provided for eager replication of uncommitted transactions. One or more apply processes of a replication client may be configured to implement eager replication of uncommitted transactions.

In eager replication, at least part of a source transaction is applied on the target before the source transaction is committed. Thus, once a source transaction is committed, much of the work of applying the source transaction on the target database has been completed, leaving less remaining to complete application of the entire source transaction at the target. Latency between the commit of the source transaction on the source database and application of the source transaction on the target database is minimized. Furthermore, for large transactions, it is possible to avoid storing large amounts of change record information received for transactions that have not been committed on the source database.

As used herein, the term "eager transaction" refers to a transaction containing database changes that will be at least partially applied at a target database before receiving a commit record indicating that the transaction has been committed on the source database. As used herein, the term "eager replication" refers to replication involving one or more eager transactions. As used herein, the terms "eager apply" refers to applying one or more database changes of a transaction before receiving an indication that the transaction has been committed on the source database. As used herein the term "non-eager" refers to a transaction for which no database changes will be applied until a commit record is received.

As used herein, the term "apply" refers to causing the execution of a database change to a target database, either through a public interface of the target database server or by otherwise causing the target database server to execute the database change. When the term "apply" is used in reference to a change record, the term refers to causing database changes needed to effect changes specified by the change record to a target database.

A replication client may handle two or more concurrent eager transactions. For example, two eager transactions may be handled in parallel, such as by two apply processes. Database changes for different transactions may be received in an interleaved manner. In one embodiment, a replication client is configured to receive database changes for multiple transactions and determine whether to treat a specific transaction as an eager transaction. For example, a transaction may be treated as an eager transaction based on dependency data, transaction size, an indication in the replication data that the transaction may be treated as an eager transaction, or other factors. The replication client may be configured to handle rollback notifications indicating that one or more database changes of an eager transaction have been rolled back on the source database.

Database Management Systems

Embodiments described herein may be used in the context of database management systems (DBMSs). A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. Although the examples described above are based on Oracle's SQL, the techniques provided herein are not limited to Oracle's SQL, to any proprietary form of SQL, to any standardized version or form of SQL (ANSI standard), or to any particular form of database command or database language.

System Overview

FIG. 1 is a block diagram depicting an embodiment of a system for replicating data between a source database and a target database. Source database server 102 is configured to maintain a source database. In one embodiment, source database server 102 is configured to log database changes made to the source database.

Extraction client 104 is configured to extract replication data 106. Replication data 106 contains sufficient information to determine what actions were performed on the source database, including the record(s) affected by an operation and the order in which the source transactions were committed. For example, extraction client 104 may process logged database changes made to the source database to extract logical replication data 106. In one embodiment, extraction client 104 does not have direct access to the source database. However, extraction client 104 may be a module of source database server 102 and/or may share one or more computing resources with source database server 102. Alternatively and/or in addition, extraction client 104 may communicate with source database server 102 over a network.

Replication data 106 contains change records that describe operations and/or transactions performed on the source database by source database server 102. As used herein, the term "change record" refers to any data describing a database change. A change record may include data showing the difference between an existing record and the new record. For example, the change records may be logical change records (LCRs) that represent source database changes. The change records further include transaction commit records. As used herein, the term "commit record" refers to any record indicating that a transaction has been committed on the source database.

In one embodiment, replication data 106 includes all transactions performed on the source database. Replication data 106 may alternatively include a subset of transactions performed on the source database. Change records included in replication data 106 may be include interleaved change records from multiple transactions. Extraction client 104 may be configured to capture operations and/or transactions performed on the source database. For example, extraction client 104 may generate a log, structure, and/or file containing database operations. Replication data may include one or more files or other data, which may be generated specifically for the purpose of replication, or alternatively generated as an audit or record file. In one embodiment, replication data 106 resides on source database server 102 outside of the source database. Alternatively and/or in addition, extraction client 104 may transmit replication data 106 over a network. For example, extraction client 104 may write replication data 106 to a network location. Alternatively and/or in addition, extraction client 104 may generate a replication data stream containing replication data 106.

Replication client 108 is configured to perform replication on the target database based on replication data 106 for the source database. The target database is maintained by target database server 110. In one embodiment, replication client 108 does not have direct access to the source database. However, replication client 108 may be a module of target database server 110 and/or may share one or more computing resources with target database server 110. Alternatively and/or in addition, replication client 108 may communicate with target database server 110 over a network.

Replication client 108 is configured to read change records contained in replication data 106. For example, the change records may be read from a file containing database operations, a network location, or over a data stream. Replication client 108 may be configured to implement eager replication by applying change records before receiving a commit record indicating that the associated transaction has been committed on the source database.

Figure 2:
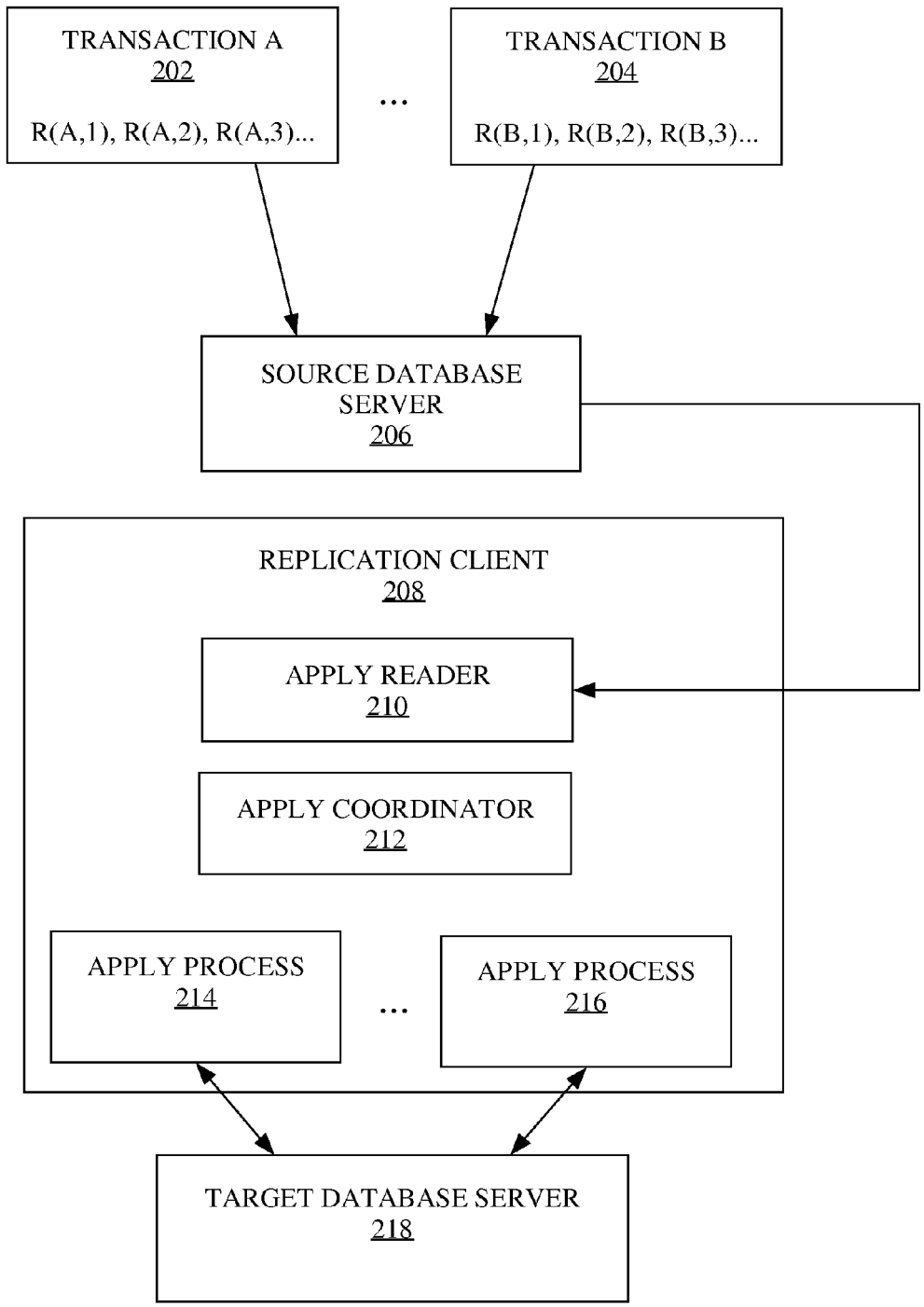
FIG. 2 is a block diagram depicting data flow in an embodiment of a replication system.

FIG. 2 is a block diagram depicting data flow in an embodiment of a replication system configured to implement eager replication. Source database server 206 is configured to maintain a source database. Transactions 202-204 are executed on the source database. Transactions 202-204 may be executed by one or more processes configured to access the source database, such as by accessing the source database through source database server 206. Processes configured to access the source database may include database server processes and client processes interacting with source database server 206. Each transaction 202-204 includes one or more database changes R(X,i), where X identifies the transaction and i identifies the database change within transaction X. In one embodiment, i indicates the order that the database change is executed in transaction X.

In one embodiment, source database server 206, a source database client, a source extraction client, and/or another source component determines whether a specific transaction is suitable for eager replication. For example, one or more transactions 202-204 may be designated as suitable for eager replication. In one embodiment, independent, concurrently executing transactions 202-204 may be designated as suitable for concurrent eager replication by a source component. The designation may be transmitted to replication client 208 in the replication data. Alternatively and/or in addition, replication client 208 may determine whether to treat a transaction as an eager transaction. Replication client 208 may make the determination independently, or may decide or base a decision based on a designation in the replication data.

Replication data, such as replication data 106, is generated based on one or more transactions 202-204 performed on the source database. The replication data may be directly or indirectly transmitted from source database server 206 to replication client 208. For example, the replication data may be generated and/or transmitted by an extraction client, such as extraction client 104.

Replication client 208 is configured to apply changes contained in the replication data to the target database. For example, replication client 208 may access the target database through a public interface of target database server 218. In one embodiment, replication client 208 may be further integrated with target database server 218 to facilitate replication on the target database.

In one embodiment, replication client 208 includes one or more components configured to process incoming change record/s and allocate the incoming change record/s to one or more apply processes 214-216. For example, replication client 208 may include apply reader 210. Apply reader 210 is configured to receive replication data and process the change records contained therein. In one embodiment, apply reader 210 is configured to perform dependency computations as change records are processed. Dependency data is used to ensure that operations and/or transactions are performed in an order that does not violate dependencies that require certain operations and/or transactions to be executed before others. The dependency data may include inter-transaction dependencies. As used herein, the term "inter-transaction dependency" refers to a dependency of a transaction on one or more other transactions. For example, if a first transaction includes an INSERT operation of a row into table X, and a second transaction includes an UPDATE operation on the same row, the second transaction is dependent on the first transaction because at least one operation of the second transaction cannot be executed before an operation of the first transaction.

In one embodiment, two or more eager transactions do not have dependencies on each other since corresponding transactions were running concurrently at the source. Thus, such transactions may only be dependent on prior committed transactions. For example, apply reader 210 may compute dependencies for each change record in an eager transaction to determine if the eager transaction has dependencies on any prior committed transactions. Transactions that commit after the eager transaction can only be dependent on the eager transaction after the eager transaction commits. Dependency information may be retained for the eager transaction.

Replication client 208 may be configured to apply one or more transactions in parallel using multiple apply processes 214-216. When one or more transactions are processed in parallel, transactions that are dependent on each other may not be applied concurrently. A dependent transaction must wait for the other transaction to be committed. When eager transaction processing is implemented, dependency data may change during the eager apply of an eager transaction. For example, a first eager transaction and the second eager transaction that are independent may be concurrently applied. After the first eager transaction commits, the second concurrent eager transaction may depend on the committed transaction. In one embodiment, a dependency may further specify that the dependency only applies to a portion of the dependent transaction. In one embodiment, a barrier dependency is set when the commit record for the eager transaction is received or otherwise processed such that all following transactions will wait until the eager transaction has been applied and committed.

Although apply reader 210 is shown in this embodiment, any other component of replication client 208 may perform the functionality described. Furthermore, dependency calculations may be generated by any other component of replication client 208, including but not limited to apply coordinator 212 and any of apply processes 214-216.

Replication client 208 may include apply coordinator 212. Apply coordinator 212 is configured to schedule the processing of transactions by apply processes 214-216. Apply coordinator 212 may use dependency data to schedule the applying of transactions by apply processes 214-216. In one embodiment, transactions that may be applied eagerly are determined outside of replication client 208. For example, one or more transactions 202-204 may be designated as suitable for eager replication in the replication data. In one embodiment, replication client 208 determines whether a transaction is an eager transaction. For example, a transaction may be treated as an eager transaction based on size, such as based on the number of change records received for the transaction and/or a memory limit for the transaction. The replication client may begin to apply a transaction eagerly based on these and other factors. In one embodiment, apply coordinator 212 assigns change records for one or more eager transactions to a specific apply process selected from apply processes 214-216. When a set of apply processes is specifically utilized to handle non-eager transactions, one or more additional apply processes may be created or activated specifically for applying one or more eager transactions.

Although apply coordinator 212 is shown in this embodiment, any other component of replication client 208 may perform functionality described. Furthermore, dependency calculations may be generated by any other component of replication client 208, including but not limited to apply coordinator 212 and any of apply processes 214-216.

Processing Change Records

Figure 3:
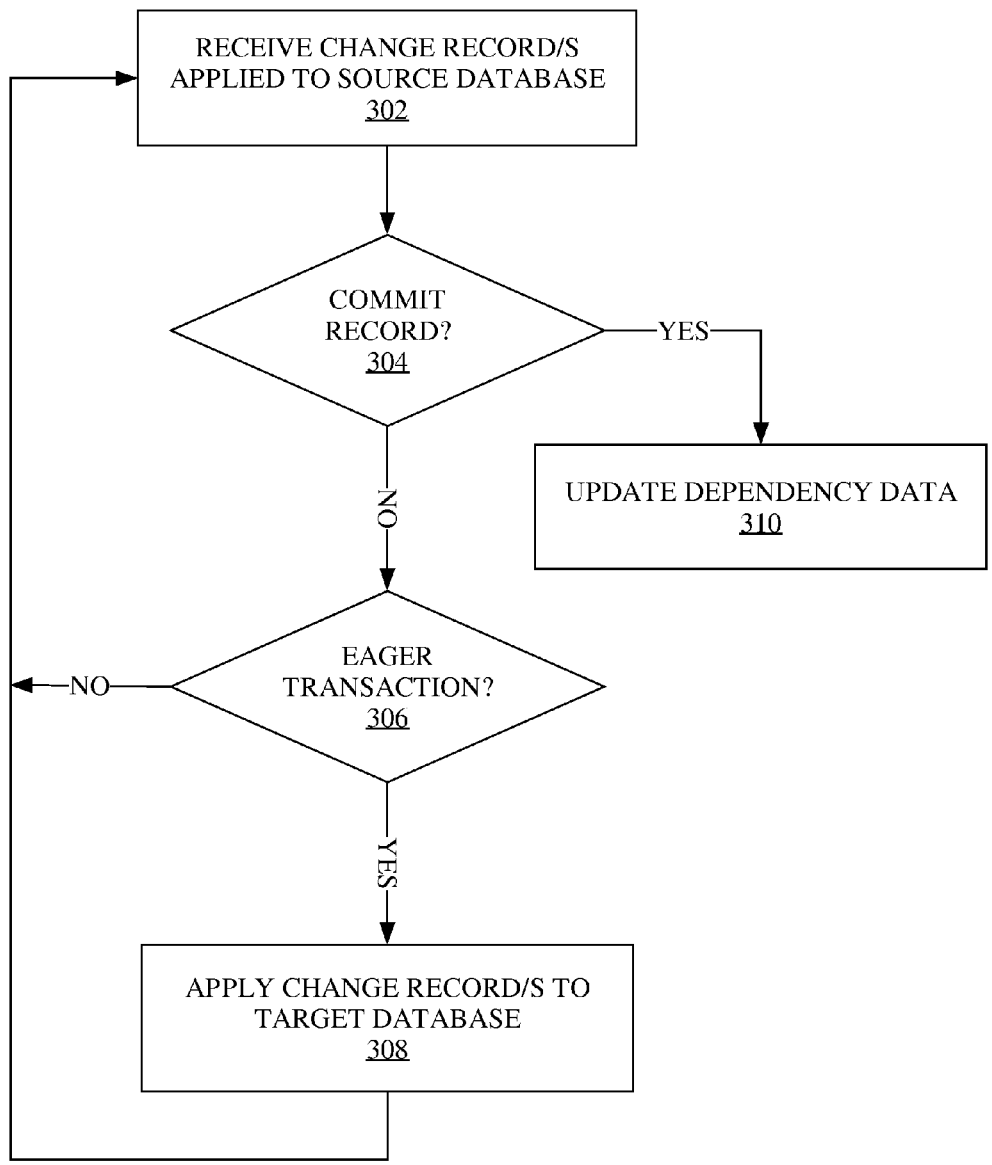
FIG. 3 is a flowchart illustrating an embodiment of a method for handling received change records in a system enable to handle eager transactions.

FIG. 3 is a flowchart illustrating an embodiment of a method for handling received change records in a system enabled to handle eager transactions.

At block 302, one or more change records are received by a replication client, such as replication client 208. The change record/s correspond to one or more database changes applied to a source database in a specific transaction. The change record/s may be read from a file, a network location and/or a streaming data source. Change record/s for the specific transaction may be interleaved with change records from other transactions, such as in replication data. In one embodiment, the replication client includes one or more components configured to process incoming change record/s and allocate the incoming change record/s to one or more apply processes. For example, change record/s associated with a specific transaction may be assigned to a specific apply process. Dependency data may also be computed for the received changed records. In one embodiment, change records are received in the order that the corresponding database changes were applied on the source database.

At decision block 304, it is determined whether the change record/s include a commit record indicating that the associated transaction has been committed on the source database. If the change record/s include a commit record, processing continues to block 310. Otherwise, processing continues to decision block 306.

At decision block 306, it is determined whether the transaction associated with the change record/s is an eager transaction. In one embodiment, the replication client determines whether a transaction is an eager transaction. For example, a transaction may be treated as an eager transaction based on time and/or size, such as based on the number of change records received for the transaction and/or a memory limit for the transaction. Alternatively and/or in addition, a designation indicating that the transaction is an eager transaction may be received, such as in the replication data. Determining whether the transaction is an eager transaction may also be based on dependency data to ensure that applying uncommitted database changes associated with the transaction will not violate any inter-transaction dependencies. The replication client may start to apply a transaction eagerly based on these and other factors. If the transaction associated with the change record/s is an eager transaction, processing continues to block 308. Otherwise, processing returns to block 302. When the transaction associated with the change record/s is not an eager transaction, the change record/s may be stored until a commit record is received and/or otherwise processed.

At block 308, the change record/s are applied to the target database. For an eager transaction, at least a portion of the change records associated with the eager transaction are applied before a commit record associated with the eager transaction is received and/or otherwise processed.

At block 310, the transaction is completed and committed in accordance with the commit record, and dependency data is updated to reflect completion of the associated transaction. When the commit record is received, any remaining unapplied change records for the associated transaction are applied, and the associated transaction is committed in accordance with the commit record. In one embodiment, later transactions and/or concurrent transactions are allowed to depend on the associated transaction after the commit for the associated transaction has been received. In one embodiment, if a specific apply process has completed processing all transactions assigned to the specific apply process, the specific apply process notifies one or more components of the replication client, such as apply coordinator 212.

Eager Transaction Processing

Figure 5:
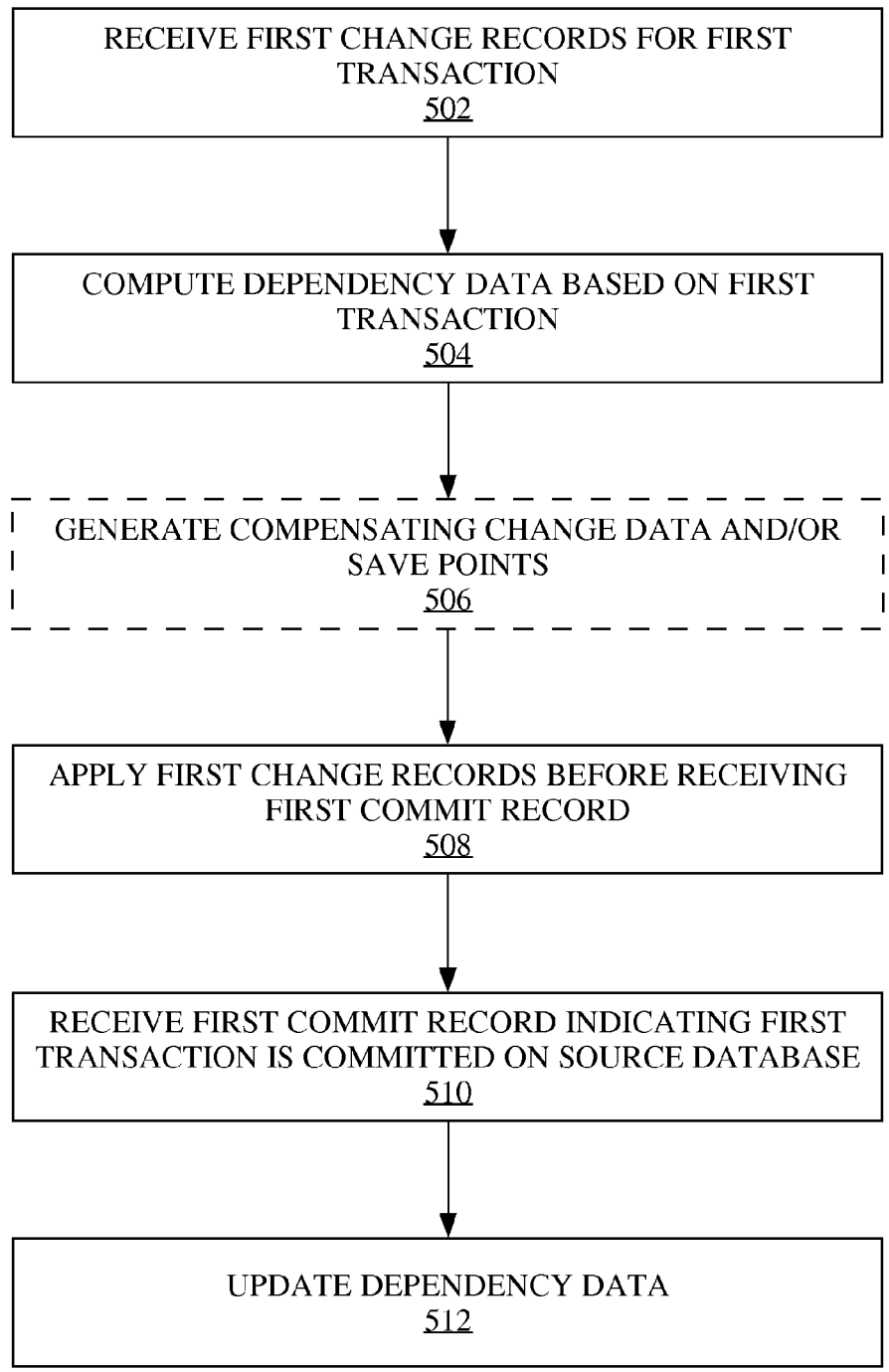
FIG. 5 is a flowchart illustrating an embodiment of a method for handling eager apply of a transaction.

FIG. 5 is a flowchart illustrating an embodiment of a method for handling eager apply of a transaction. In one embodiment, the method is performed by a replication client, such as replication client 208.

At block 502, a first plurality of change records is received. The first plurality of change records correspond to changes applied to a source database in a first transaction. The first plurality of change records may be received by a replication client, such as replication client 208. The change records may be read from a file, a network location and/or a streaming data source. In one embodiment, the replication client includes one or more components configured to process incoming change records, and to allocate the incoming change record/s to one or more apply processes. For example, change records associated with a specific transaction may be assigned to a specific apply process.

At block 504, dependency data is computed for the first transaction. In one embodiment, the dependency data is computed for change records as they are received by the replication client, such as replication client 208. The dependency data includes inter-transaction dependency data for a plurality of transactions applied or scheduled to be applied on a target database. In one embodiment, concurrent eager transactions will not depend on any other concurrent eager transactions for which the commit has not yet been received.

At optional block 506, compensating change data and/or save points are generated. Compensating change data may include one or more compensating change records. The compensating change records include sufficient data to undo one or more database changes corresponding to change records that have been applied to the target database in an eager transaction. In one embodiment, a compensating change record is generated for each change record that is applied. The compensating change records may be generated and/or stored by a component of the target database server, a component of the replication client, a separate component, or any combination thereof.

At block 508, at least a portion of the first plurality of change records is applied on the target database before receiving and/or otherwise processing a first commit record for the first transaction. In one embodiment, a specific apply process is configured to eagerly apply all change records associated with the first transaction.

Save points, such as save points 422-424, include data sufficient to roll back a transaction such that later database changes in the transaction are removed, and prior database changes in the transaction are unaffected. Save points may be periodically generated, such as based on time elapsed, change records processed, or any other metric. The save points may be generated and/or stored by a component of the target database server, a component of the replication client, a separate component, or any combination thereof.

At block 510, a first commit record for the first transaction is received indicating that the first transaction has been committed on the source database. If any other change records for the first transaction are pending, they may be applied and committed so that the first transaction may be treated as complete on the target database.

At block 512, the dependency data is updated to reflect completion of the first transaction. After the first transaction is complete and committed, transactions that depend on the first transaction may be applied using either eager apply or non-eager apply techniques.

Concurrent Eager Transactions

Figure 6:
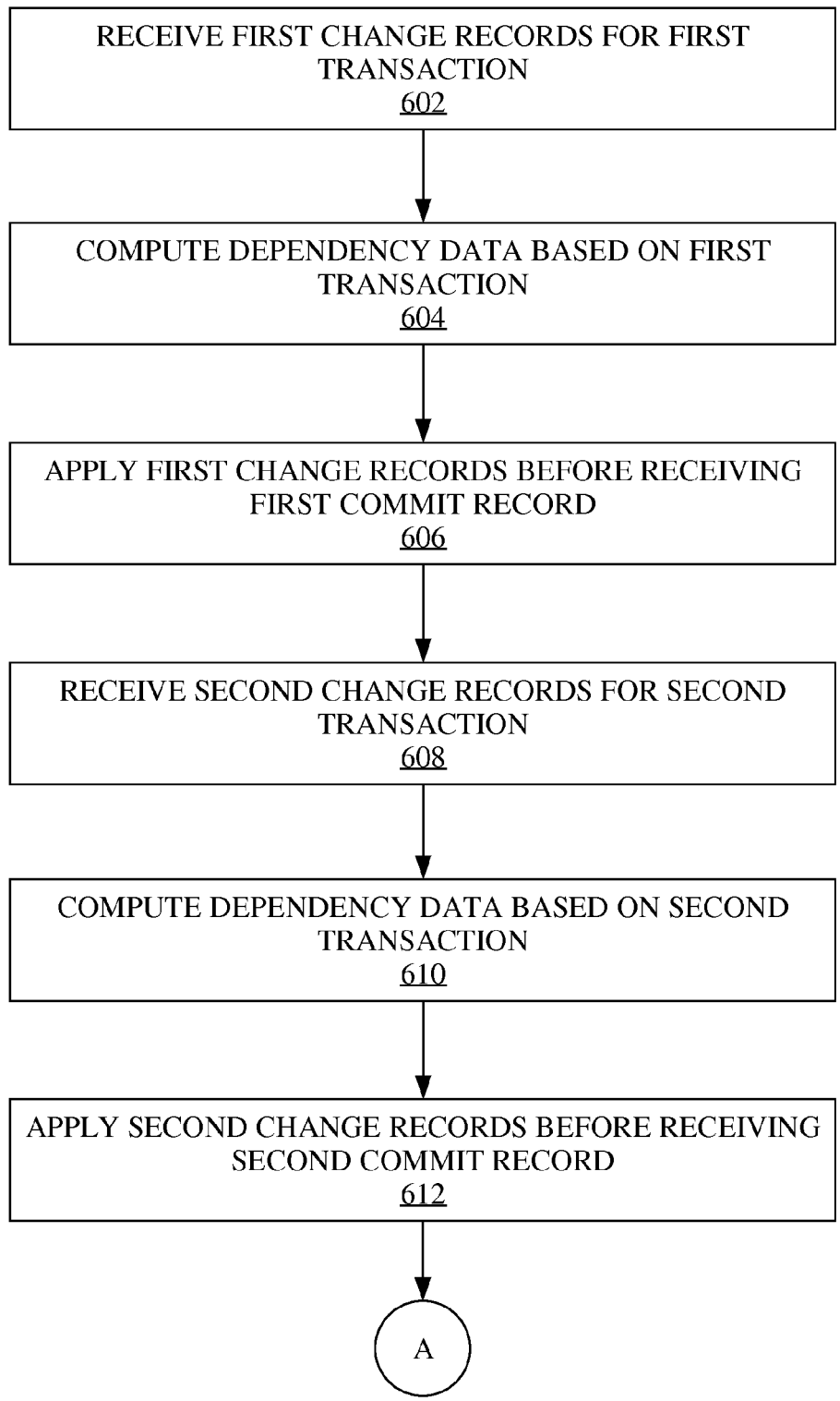
FIG. 6 is a flowchart illustrating an embodiment of a method for handling eager apply of multiple transactions concurrently.

FIG. 6 is a flowchart illustrating an embodiment of a method for handling eager apply of multiple transactions concurrently. In one embodiment, the method is performed by a replication client, such as replication client 208.

At block 602, a first plurality of change records is received. The first plurality of change records correspond to changes applied to a source database in a first transaction.

The first plurality of change records may be received by a replication client, such as replication client 208. In one embodiment, the replication client includes one or more components configured to process incoming change records, and to allocate the incoming change record/s to one or more apply processes. For example, change records associated with the first transaction may be assigned to a first apply process.

At block 604, dependency data is computed for the first transaction. In one embodiment, the dependency data is computed for change records as they are received by the replication client, such as replication client 208. The dependency data includes inter-transaction dependency data for a plurality of transactions applied or scheduled to be applied on a target database. Concurrent eager transactions will not depend on any other concurrent eager transaction that has not been committed. For example, changes records of the second transaction that occur before the first commit record for the first transaction cannot be dependent of the first transaction, and change records of the second transaction that occur after the first commit record for the first transaction may be dependent on the first transaction.

At block 606, at least a portion of the first plurality of change records are applied on the target database before receiving and/or otherwise processing the first commit record for the first transaction. In one embodiment, a first apply process is configured to eagerly apply all change records associated with the first transaction.

At block 608, a plurality of second change records is received. The second plurality of change records corresponds to changes applied to the source database in a second transaction. In one embodiment, the plurality of second change records is interleaved with a plurality of first change records in a data source, such as a file, a network location and/or a streaming data source. In one embodiment, change records associated with the second transaction are allocated to a second apply process.

At block 610, the dependency data is computed for the second transaction. The dependency data may be computed for change records as they are received by the replication client, such as replication client 208.

At block 612, at least a portion of the second plurality of change records is applied on the target database before receiving and/or otherwise processing a second commit record for the second transaction. In one embodiment, the first transaction and the second transaction are concurrently treated as eager transactions for at least a period of time. When two transactions are not dependent on each other, the transactions may be concurrently eagerly applied.

Figure 7:
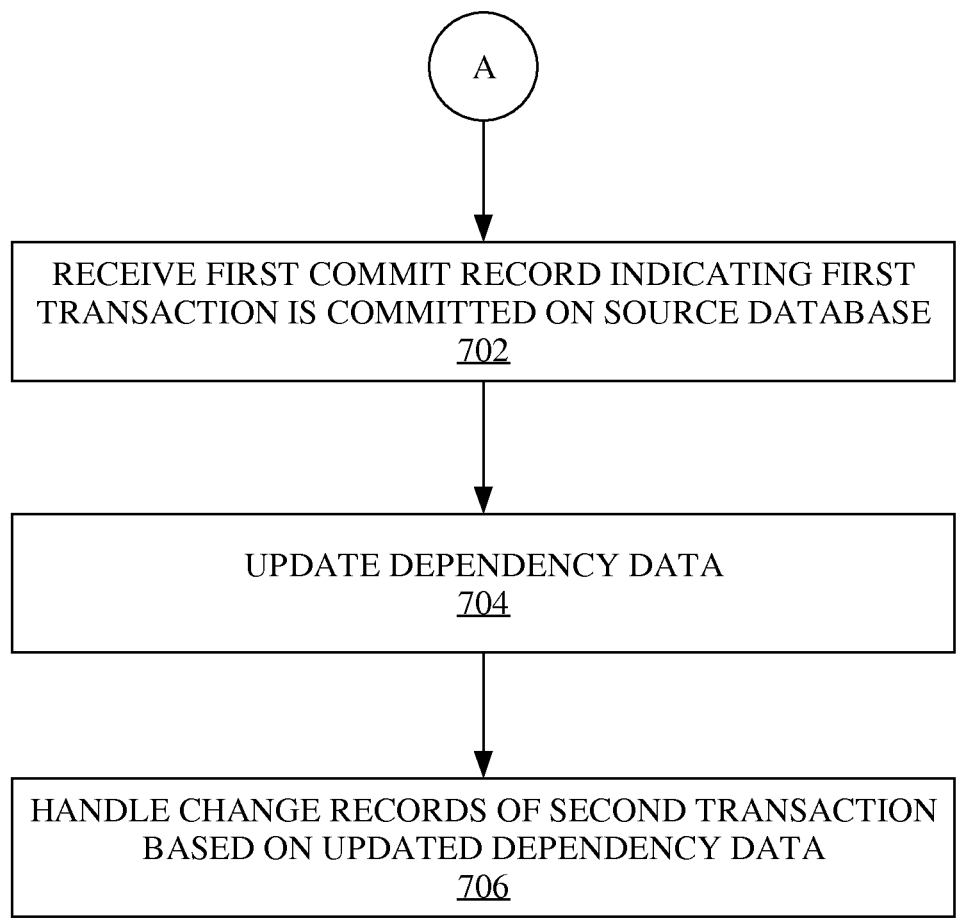
FIG. 7 is a flowchart illustrating an embodiment of a method for managing and using dependency data when an eager transaction is committed.

FIG. 7 is a flowchart illustrating an embodiment of a method for managing and using dependency data when two eager transactions are eagerly applied and one of the eager transactions is committed. In one embodiment, the method is performed by a replication client, such as replication client 208.

At block 702, a first commit record for the first transaction is received indicating that the first transaction has been committed on the source database. If any other change records for the first transaction are pending, they may be applied and committed so that the first transaction may be treated as complete on the target database.

At block 704, the dependency data is updated to reflect completion of the first transaction. After the first transaction is complete and committed, transactions that depend on the first transaction may be applied using either eager apply or non-eager apply techniques.

At block 706, change records of the second transaction are handled based on the updated dependency data. The fact that the first transaction is complete may affect the processing of change records for the second transaction.

One example of isolating the dependencies in the second transaction is a barrier dependency. A barrier dependency is associated with the committing of an associated transaction. Transactions, including eager transactions, may depend on the associated transaction after the associated transaction is committed. When applying change records on the target database, non-eager transactions that commit after the barrier dependency must not be applied until after the associated transaction is applied and committed. For eager transactions, change records that are ordered before the barrier dependency may be applied before the associated transaction is applied and committed; change records that follow the barrier dependency must wait until after the associated transaction is applied and committed. Thus, the first portion of the eager transaction may be concurrently eagerly applied with the associated transaction. In one embodiment, the barrier dependency is set to match the first commit record for the first transaction. When the barrier dependency is reached after the first portion of the second transaction is applied, eager applying of the second transaction may halt until the first transaction is complete.

A simplified example of processing interleaved change records using different apply servers and/or processes is provided below, for change records ordered as follows:

R(A,1); R(B,1); R(C,1); C(C); R(B,2); R(A,2); C(B); R(A,3); C(A);

where R(x,y) indicates set y of change records for transaction x, and C(x) is the commit for transaction x. In one embodiment, the example ordered change records cause processing as follows:

Receive R(A,1) and compute dependencies;
Assign R(A,1) to apply server/process P1;
Receive R(B,1) and compute dependencies;
Assign R(B,1) to different apply server/process P2 (changes for R(B,1) and R(A,1) may execute in parallel);
Receive R(C,1) and C(C) (non-eager transaction);
Assign Transaction C to another apply server/process P3 (changes for Transaction C may execute in parallel with Transactions A and B);
Receive R(B,2) and compute dependencies (could possibly depend on transaction C);
Send R(B,2) to P2 to execute the changes;
Receive commit record C(B);
Update dependency data with the information for B (set a barrier);
Send the commit to P2;
Receive R(A,3) and compute dependencies (could possibly depend on transaction C, and would wait on the barrier dependency for transaction B);
Wait for the transaction B to be applied and committed before sending R(A,3) to P1;
Receive commit C(A) and update dependency data with the information for A (set a barrier);
Send the commit to P1.

Eager Transaction Rollback

When one or more change records associated with an eager transaction are applied to a target database before a commit record is received or otherwise processed, there is the possibility that at least a portion of the transaction will be rolled back on the source database, including change records that have already been applied to the target database. In one embodiment, a rollback on the source database is represented in the replication data by a rollback notification comprising a rollback point. The replication client may be configured to maintain sufficient data for an eager transaction to restore the target database to a prior state based on the rollback point. For example, the effects of at least one applied change record occurring after the rollback point must be removed.

Save points may be created to assist in rolling back a transaction to a specified rollback point. Save points may be used to indicate a point within a transaction that can be "rolled back to" without affecting any work done in the transaction before the save point was created. Save points include data sufficient to roll back a transaction such that later database changes in the transaction are removed, and prior database changes in the transaction are unaffected. The save points may be generated and/or stored by a component of the target database server, a component of the replication client, a separate component, or any combination thereof.

Save points may be taken after applying each change record in a transaction. Save points may also be periodically generated, such as based on time elapsed, change records processed, or any other metric. When save points are periodically generated, there may not be an exact save point for a specific rollback point included in a rollback notification.

Figure 4:
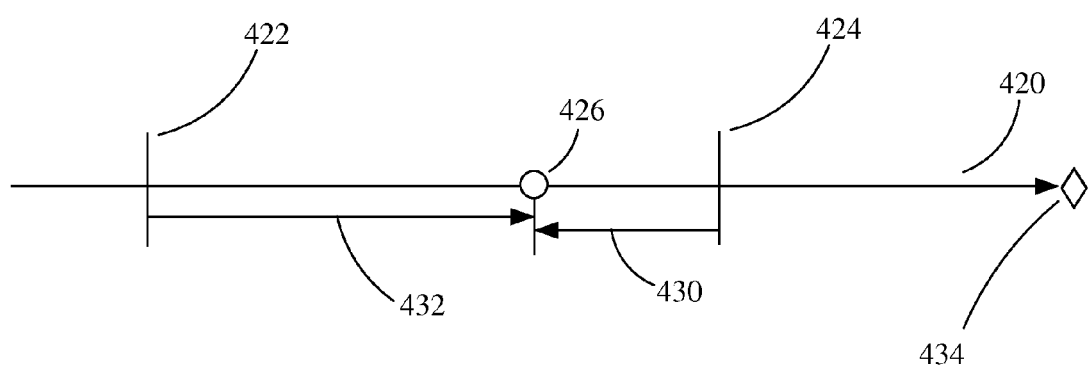
FIG. 4 illustrates a transaction and rollback data associated with one or more embodiments.

FIG. 4 illustrates an embodiment of rollback data compatible with eager replication of uncommitted transactions. A rollback may be a partial rollback to a previous point in the transaction, or a complete rollback, where all changes of the transaction are discarded. Transaction 420 is represented as an ordered stream of change records for transaction 420. Save points 422-424 are generated periodically for transaction 420. A rollback notification 434 is received in the stream of change records for transaction 420. Rollback notification 434 indicates that the transaction should be rolled back to a prior state, such as a prior state indicated by rollback point 426. When rollback notification 434 is received, one of save points 422-424 is selected. The selected save point may be determined based on one or more factors, such as the proximity to the rollback point, characteristics of concurrent eager transactions and/or non-eager transactions, the availability of compensating change data, or a combination thereof.

One method of rolling a transaction back to a rollback point involves applying compensating changes to undo one or more changes from the current position or a save point occurring after the rollback point. A second method of rolling a transaction back involves restoring a save point occurring before the rollback and reapplying one or more change records up to the rollback point. Although a save point is not needed when using compensating changes, a save point may make the process more efficient. Embodiments may implement one or more variants of the first method, the second method, or both methods.

In one embodiment, the selected save point 424 is the first save point after rollback point 426. In this case, one or more change records 430 of transaction 420 occurring between the selected save point 424 still need to be undone. In one embodiment, one or more compensating changes are applied to undo one or more database changes applied in transaction 420 to restore the target database to a prior state associated with rollback point 426. Compensating changes may be represented as compensating change records. A compensating change record includes sufficient data to undo one or more database changes corresponding to change records that have been applied to the target database in an eager transaction. For example: for a change record corresponding to an INSERT, the compensating change record would correspond to a DELETE of the inserted row; for a change record corresponding to a DELETE, the compensating change record would correspond to an INSERT, and would include sufficient information to restore the deleted data.

In one embodiment, the compensating change records are provided in the replication data. Alternatively and/or in addition, compensating change records may be stored on the target side, such as by the target database and/or the replication client. In one embodiment, the replication client generates a compensating change record for each change record processed. The compensating change records may be applied in reverse order to restore the target database.

In one embodiment, the selected save point 422 is the last save point before rollback point 426. In this case, one or more change records 432 of transaction 420 occurring between selected save point 422 and rollback point 426 are re-applied to restore the target database to a prior state associated with rollback point 426. Change records 432 may be re-applied based on the original change records received in the replication data, or based on logging data generated during the original apply for the change records.

Figure 8:
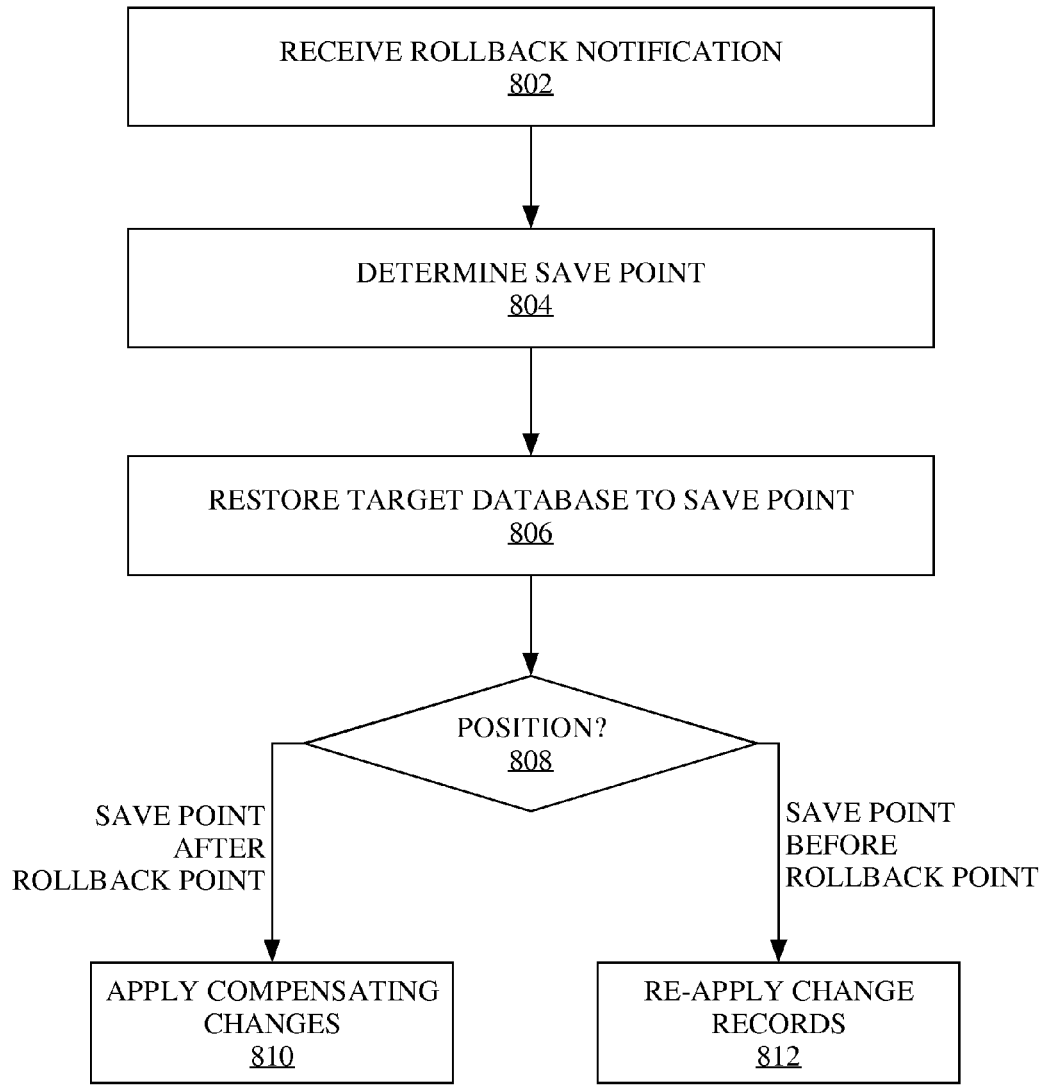
FIG. 8 is a flowchart illustrating an embodiment of for restoring a target database to a prior state based on a rollback point.

FIG. 8 is a flowchart illustrating an embodiment for restoring a target database to a prior state based on a rollback point. In one embodiment, the method is performed by a replication client, such as replication client 208.

At block 802, a rollback notification is received. The rollback notification includes the rollback point for a specified transaction, where the specified transaction is an eager transaction. The rollback notification indicates that changes after the rollback point have been rolled back on the source database for the specified transaction. In one embodiment, a component of the replication client, such as apply reader 210, removes the rolled-back change records for the specified transaction that have been received but not applied or assigned to an apply process.

At block 804, a save point is determined from the stored save points of the target database. In one embodiment, the save point is selected from the last save point before the rollback point of the specified transaction and the first save point after the rollback point of the specified transaction. The save point may be determined based on one or more factors, such as the proximity to the rollback point.

At block 806, the target database is restored to the selected save point. At decision step 808, the position of the selected save point relative to the rollback point is evaluated. If the save point is after the rollback point, processing continues to block 810. If the save point is before the rollback point, processing continues to block 812. If the save point is identical to the rollback point, no further processing needs to be performed with respect to the specified transaction.

At block 810, one or more compensating changes are applied to undo one or more database changes applied in the eager transaction to restore the target database to a prior state associated with the rollback point. The compensating changes may be applied in reverse order to restore the target database.

At block 812, one or more change records occurring between the selected save point and the rollback point are re-applied to restore the target database to a prior state associated with the rollback point. The change records may be re-applied based on the original change records received in the replication data, or based on logging data generated during the original apply for the change records.

In the embodiment shown, the method may restore a prior state based on save points that are either before or after the rollback point. Other embodiments may implement a subset of the functionality shown in FIG. 8. For example, compensating changes may be used without save points, and save points may be used without compensating changes.

Hardware Overview

Figure 9:
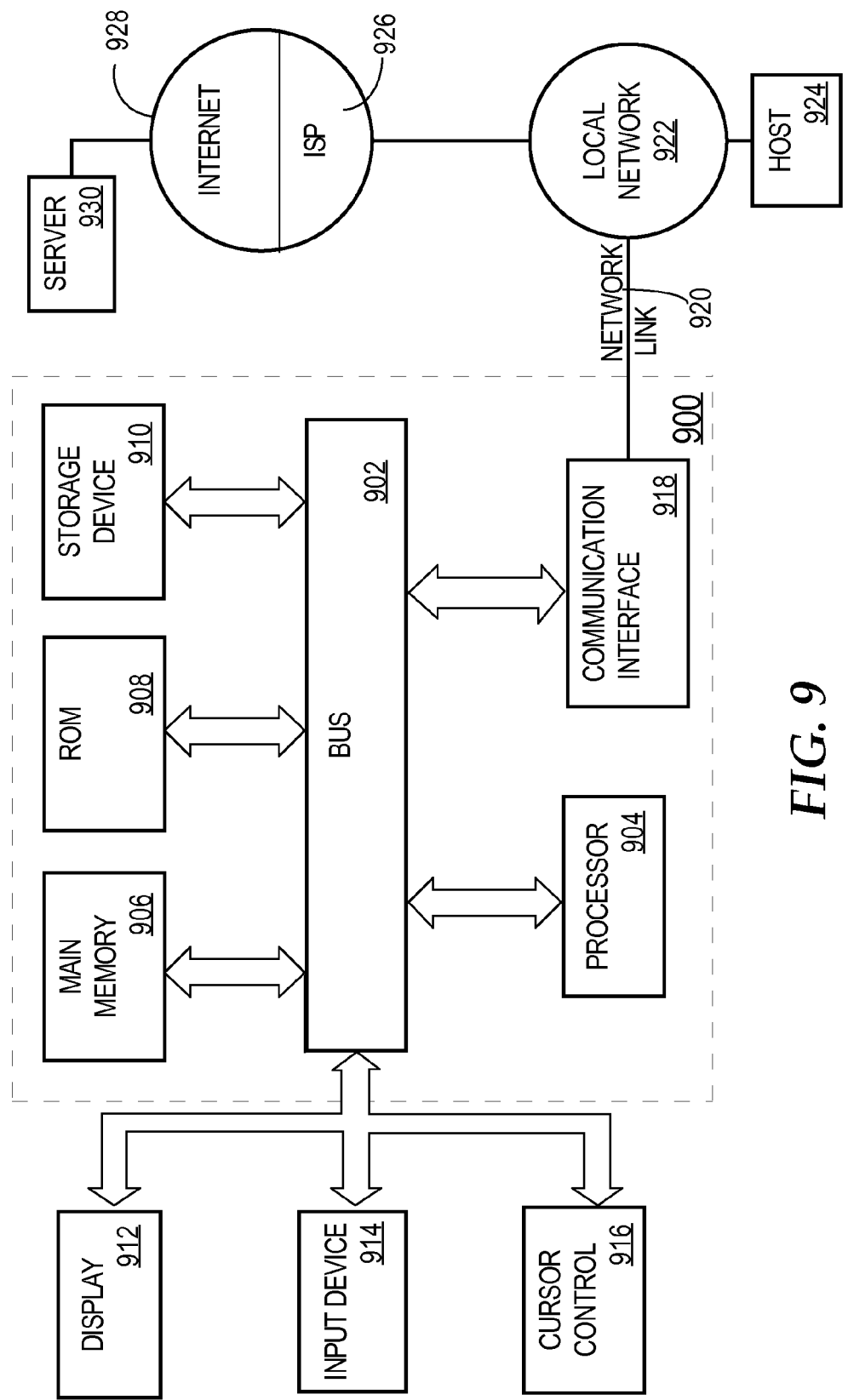
FIG. 9 illustrates a computer system upon which one or more embodiments may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media and transmission media. Storage media includes both non-volatile media and volatile media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving in a data stream, by a replication client, a first plurality of change records corresponding to database changes applied to a source database in a first transaction, wherein the first plurality of change records includes a first commit record indicating that the first transaction is committed on the source database;
computing, by the replication client, first transaction dependency data based on at least a portion of the first plurality of change records before receiving an indication that the first transaction is committed on the source database;
applying to a target database, by the replication client and based at least in part on the first transaction dependency data, at least a portion of the first plurality of change records before receiving the first commit record in the data stream;
in response to receiving the first commit record of the first transaction: completing applying the first plurality of change records, and committing the first transaction on the target database;
wherein the method is performed by one or more computing devices.

2. The method of claim 1, further comprising:
receiving in the data stream, by the replication client, a second plurality of change records corresponding to database changes applied to the source database in a second transaction, wherein the second plurality of change records includes a second commit record indicating that the second transaction is committed on the source database;
computing second transaction dependency data based on the second plurality of change records;
applying to the target database, by the replication client, at least a portion of the second plurality of change records before the first commit record is received or otherwise processed by the replication client;
wherein said applying at least a portion of the second plurality of change records is based at least in part on at least one of: the first transaction dependency data or the second transition dependency data.

3. The method of claim 2, wherein the first plurality of change records is applied to the target database by a first apply process and wherein the second plurality of change records is applied to the target database by a second apply process.

4. The method of claim 2, wherein at least a portion of the second plurality of change records is applied before receiving the second commit record in the data stream.

5. The method of claim 2, wherein the first plurality of change records and the second plurality of change records are interleaved in the data stream.

6. The method of claim 1,
wherein updating the inter-transaction dependency data for the target database comprises storing a barrier dependency associated with the first commit record;
further comprising:
receiving in the data stream, by the replication client, a second plurality of change records corresponding to database changes applied to the source database in a second transaction, wherein the second plurality of change records includes a second commit record indicating that the second transaction is committed on the source database, wherein the first transaction is committed before the second transaction on the source database, wherein a first portion of the second plurality of change records is timestamped before the first commit record, and wherein a second portion of the second plurality of change records is timestamped after the first commit record;
applying at least a subset of the first portion of the second plurality of change records to the target database before the first commit record is received;
applying the second portion of the second plurality of change records to the target database after the first transaction is committed on the target database.

7. The method of claim 1, further comprising:
receiving, in the data stream, a rollback notification indicating that database changes after a rollback point have been rolled back on the source database in the first transaction;
restoring the target database to a prior state by removing effects of at least one of the first plurality of change records that have been applied to the target database.

8. The method of claim 7, further comprising:
generating a first plurality of compensating change records, each compensating change corresponding to an applied change record of the first plurality of change records;
wherein restoring the target database comprises applying, in reverse order, at least one of the first plurality of compensating change records occurring after the rollback point.

9. The method of claim 8, further comprising:
generating a plurality of save points on the target database;
restoring a selected save point on the target database, wherein the selected save point is after a rollback point indicated by the rollback notification;
wherein the at least one of the first plurality of compensating change records applied occur before the save point.

10. The method of claim 7, wherein restoring the target database comprises:
generating a plurality of save points on the target database;
restoring a selected save point on the target database, wherein the selected save point is before a rollback point indicated by the rollback notification;
re-applying at least a portion of the first plurality of change records occurring between the selected save point and the rollback point.

11. One or more non-transitory computer-readable media storing instructions, wherein the instructions include:
- instructions which, when executed by one or more hardware processors, cause receiving in a data stream, by a replication client, a first plurality of change records corresponding to database changes applied to a source database in a first transaction, wherein the first plurality of change records includes a first commit record indicating that the first transaction is committed on the source database;
- instructions which, when executed by one or more hardware processors, cause computing, by the replication client, first transaction dependency data based on at least a portion of the first plurality of change records before receiving an indication that the first transaction is committed on the source database;
- instructions which, when executed by one or more hardware processors, cause applying to a target database, by the replication client and based at least in part on the first transaction dependency data, at least a portion of the first plurality of change records before receiving the first commit record in the data stream;
- instructions which, when executed by one or more hardware processors, cause, in response to receiving the first commit record of the first transaction; completing applying the first plurality of change records, and committing the first transaction on the target database.

12. The one or more non-transitory computer-readable media of claim 11, wherein the instructions include:
- instructions which, when executed by one or more hardware processors, cause receiving in the data stream, by the replication client, a second plurality of change records corresponding to database changes applied to the source database in a second transaction, wherein the second plurality of change records includes a second commit record indicating that the second transaction is committed on the source database;
- instructions which, when executed by one or more hardware processors, cause computing second transaction dependency data based on the second plurality of change records;
- instructions which, when executed by one or more hardware processors, cause applying to the target database, by the replication client, at least a portion of the second plurality of change records before the first commit record is received or otherwise processed by the replication client;
- wherein said applying at least a portion of the second plurality of change records is based at least in part on at least one of: the first transaction dependency data or the second transaction dependency data.

13. The one or more non-transitory computer-readable media of claim 12, wherein the first plurality of change records is applied to the target database by a first apply process and wherein the second plurality of change records is applied to the target database by a second apply process.

14. The one or more non-transitory computer-readable media of claim 12, wherein at least a portion of the second plurality of change records is applied before receiving the second commit record in the data stream.

15. The one or more non-transitory computer-readable media of claim 12, wherein the first plurality of change records and the second plurality of change records are interleaved in the data stream.

16. The one or more non-transitory computer-readable media of claim 11, wherein updating the inter-transaction dependency data for the target database comprises storing a barrier dependency associated with the first commit record;
wherein the instructions include:
- instructions which, when executed by one or more hardware processors, cause receiving in the data stream, by the replication client, a second plurality of change records corresponding to database changes applied to the source database in a second transaction, wherein the second plurality of change records includes a second commit record indicating that the second transaction is committed on the source database, wherein the first transaction is committed before the second transaction on the source database, wherein a first portion of the second plurality of change records is timestamped before the first commit record, and wherein a second portion of the second plurality of change records is timestamped after the first commit record;
- instructions which, when executed by one or more hardware processors, cause applying at least a subset of the first portion of the second plurality of change records to the target database before the first commit record is received;
- instructions which, when executed by one or more hardware processors, cause applying the second portion of the second plurality of change records to the target database after the first transaction is committed on the target database.

17. The one or more non-transitory computer-readable media of claim 11, wherein the instructions include:
- instructions which, when executed by one or more hardware processors, cause receiving, in the data stream, a rollback notification indicating that database changes after a rollback point have been rolled back on the source database in the first transaction;
- instructions which, when executed by one or more hardware processors, cause restoring the target database to a prior state by removing effects of at least one of the first plurality of change records that have been applied to the target database.

18. The one or more non-transitory computer-readable media of claim 17, wherein the instructions include:
- instructions which, when executed by one or more hardware processors, cause generating a first plurality of compensating change records, each compensating change corresponding to an applied change record of the first plurality of change records;
- wherein restoring the target database comprises applying, in reverse order, at least one of the first plurality of compensating change records occurring after the rollback point.

19. The one or more non-transitory computer-readable media of claim 18, wherein the instructions include:
- instructions which, when executed by one or more hardware processors, cause generating a plurality of save points on the target database;
- instructions which, when executed by one or more hardware processors, cause restoring a selected save point on the target database, wherein the selected save point is after a rollback point indicated by the rollback notification;
- instructions which, when executed by one or more hardware processors, cause wherein the at least one of the first plurality of compensating change records applied occur before the save point.

20. The one or more non-transitory computer-readable media of claim 17, wherein restoring the target database comprises:
- generating a plurality of save points on the target database;
- restoring a selected save point on the target database, wherein the selected save point is before a rollback point indicated by the rollback notification;
- re-applying at least a portion of the first plurality of change records occurring between the selected save point and the rollback point.

\* \* \* \* \*

UNITED STATES PATENT AND TRADEMARK OFFICE
CERTIFICATE OF CORRECTION

PATENT NO. : 9,747,356 B2
APPLICATION NO. : 14/162053
DATED : August 29, 2017
INVENTOR(S) : Lu et al.

Page 1 of 1

It is certified that error appears in the above-identified patent and that said Letters Patent is hereby corrected as shown below:

In the Claims

In Column 15, Line 62, in Claim 2, delete "transition" and insert -- transaction --, therefor.

In Column 16, Lines 8-10, in Claim 6, below "claim 1," delete "wherein updating the inter-transaction dependency data for the target database comprises storing a barrier dependency associated with the first commit record;".

In Column 18, Lines 1-3, in Claim 16, above "wherein the instructions include" delete "wherein updating the inter-transaction dependency data for the target database comprises storing a barrier dependency associated with the first commit record;".

Signed and Sealed this
Twenty-ninth Day of May, 2018

Andrei Iancu
*Director of the United States Patent and Trademark Office*